(12) United States Patent
Langton et al.

(10) Patent No.: US 8,080,271 B2
(45) Date of Patent: Dec. 20, 2011

(54) FOOD INTERLEAVER, METHOD FOR IMPARTING FLAVOR TO FOOD PRODUCT, AND COMBINATION FOOD PRODUCT AND FOOD INTERLEAVER

(75) Inventors: David Langton, Mosinee, WI (US); Michael Orlovsky, Wausau, WI (US); Amanda Carlson, Mosinee, WI (US)

(73) Assignee: Wausau Paper Mills, LLC, Mosiness, WI (US)

( * ) Notice: Subject to any disclaimer, the term of this patent is extended or adjusted under 35 U.S.C. 154(b) by 0 days.

(21) Appl. No.: 12/586,040

(22) Filed: Sep. 15, 2009

(65) Prior Publication Data

US 2010/0015301 A1 Jan. 21, 2010

Related U.S. Application Data

(62) Division of application No. 11/136,303, filed on May 23, 2005, now Pat. No. 7,601,375.

(51) Int. Cl.
*A22C 13/00* (2006.01)
(52) U.S. Cl. ........ 426/420; 426/124; 162/180; 162/135; 162/158
(58) Field of Classification Search .................. 426/420, 426/124; 162/180, 135, 158
See application file for complete search history.

(56) References Cited

U.S. PATENT DOCUMENTS

| | | |
|---|---|---|
| 1,607,552 A | 11/1926 | Maze |
| 1,762,930 A | 6/1930 | Manson |
| 1,942,438 A | 1/1934 | Manson |
| 2,142,986 A | 1/1939 | Arnold, Jr. |
| 2,343,065 A | 2/1944 | Kumler et al. |
| 2,637,665 A | 5/1953 | Dodge |
| 3,241,968 A | 3/1966 | Garth |
| 3,525,668 A | 8/1970 | Goldstein |
| 3,675,387 A * | 7/1972 | Lekan ............................. 53/157 |
| 3,711,314 A | 1/1973 | Campbell |
| 3,985,932 A | 10/1976 | Porter |
| 4,371,553 A | 2/1983 | Gilling et al. |
| 4,375,482 A | 3/1983 | Maroszek et al. |
| 4,487,657 A | 12/1984 | Gomez |
| 4,919,724 A | 4/1990 | Cenisio et al. |
| 5,117,717 A | 6/1992 | Mally |
| 5,160,484 A | 11/1992 | Nikoloff |
| 5,456,800 A | 10/1995 | Tansley et al. |
| 5,695,608 A | 12/1997 | Yagi et al. |
| 5,834,076 A | 11/1998 | Ferrero et al. |
| 5,858,173 A | 1/1999 | Propst, Jr. |
| 5,865,953 A | 2/1999 | Rottger et al. |
| 5,989,696 A | 11/1999 | McCarthy et al. |
| 6,263,640 B1 | 7/2001 | Handel |
| 6,852,198 B1 | 2/2005 | Yamazaki et al. |
| 7,189,308 B2 | 3/2007 | Feit et al. |

FOREIGN PATENT DOCUMENTS

CA 2378040 10/2002

* cited by examiner

*Primary Examiner* — Michael C Miggins
(74) *Attorney, Agent, or Firm* — Merchant & Gould, P.C.

(57) ABSTRACT

A food interleaver is provided according to the invention. The food interleaver includes a paper base sheet, a release and barrier component for providing the food interleaver with release and barrier properties, and a food flavorant component. The food flavorant component is provided to transfer from the food interleaver to a food product that contacts the food interleaver, and provide the resulting food product with a desired flavor. A method for imparting flavor to food product and a combination food product and food interleaver are provided.

19 Claims, 2 Drawing Sheets

FOOD INTERLEAVER, METHOD FOR IMPARTING FLAVOR TO FOOD PRODUCT, AND COMBINATION FOOD PRODUCT AND FOOD INTERLEAVER

CROSS REFERENCE TO RELATED APPLICATIONS

This application is a divisional of application Ser. No. 11/136,303, filed May 23, 2005, now U.S. Pat. No. 7,601,375. Application Ser. No. 11/136,303 is incorporated herein by reference in its entirety.

FIELD OF THE INVENTION

The invention relates to a food interleaver, a method for imparting flavor to food product, and a combination food product and food interleaver. The food interleaver can include a paper base sheet and a food flavorant component. As a result of contact between the food interleaver and a food product, the food flavorant component can transfer from the food interleaver to the food product.

BACKGROUND OF THE INVENTION

Food products are often flavored by the addition of a food flavorant during the manufacture of the food products. Exemplary food products having a food flavorant include cheese, meat patties, and lunchmeat. An exemplary cheese product can be manufactured having a smoky flavor as a result of the addition of a liquid smoke flavorant during the cheese manufacturing process.

Food interleavers are often used to separate slices of cheese and slices of meat. An exemplary food interleaver is disclosed in U.S. application Ser. No. 10/291,810 that was filed with the United States Patent and Trademark Office on Nov. 8, 2002. The entire disclosure of U.S. application Ser. No. 10/291,810 is incorporated herein by reference. Food interleavers have been constructed so that they impart very little, if any, flavor to food product.

SUMMARY OF THE INVENTION

A food interleaver is provided according to the invention. The food interleaver includes a paper base sheet, a release and barrier component for providing the food interleaver with release and barrier properties, and a food flavorant component. The food flavorant component is provided to transfer from the food interleaver to a food product that contacts the food interleaver, and provide the resulting food product with a desired flavor.

A method for imparting flavor to food product is provided according to the invention. The method includes a step of contacting a food interleaver containing a food flavorant component with a food product for a length of time sufficient to allow at least a portion of the food flavorant component to transfer from the food interleaver to the food product.

A combination food product and food interleaver is provided according to the invention. The combination food product and food interleaver includes quantities of food product (such as slices) and a food interleaver provided between the quantities of food product. The food interleaver includes a food flavorant component that transfers from the food interleaver to the food product to impart the food product with a flavor.

DETAILED DESCRIPTION OF THE INVENTION

Figure 1:
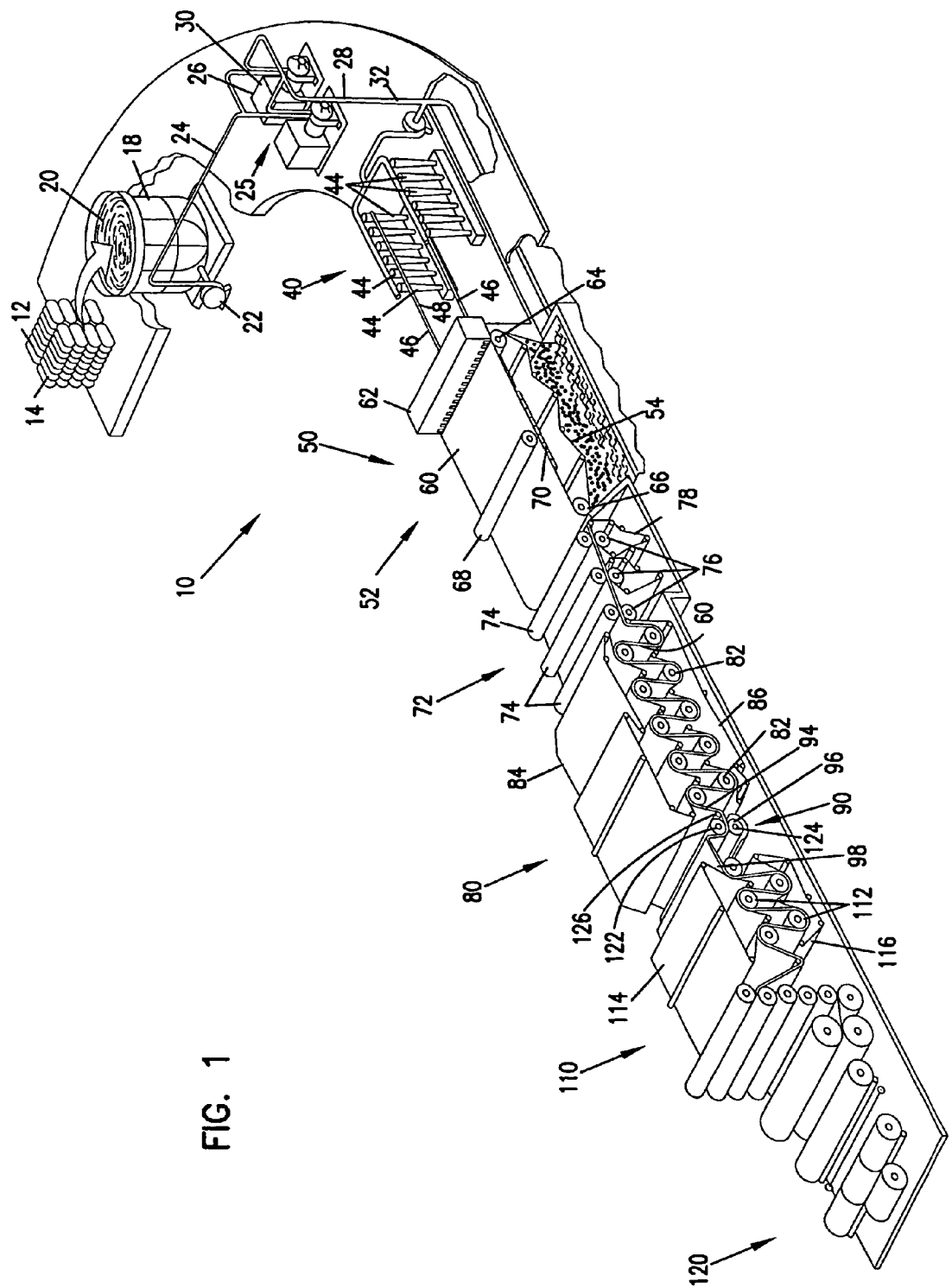
FIG. 1 is a diagrammatic view of an exemplary process for manufacturing a food interleaver according to the invention.

A food interleaver refers to a paper product that can be used to separate quantities of food product. Quantities of food product refer to items of food product such as slices or items that are packaged together but are not considered slices. The food interleaver can assist with the removal of the quantities of food product. Exemplary food products commonly available in slices include cheeses and meats such as cheeses and meats for use in sandwich making (e.g., luncheon cheeses and meats). Food interleavers that keep slices separate can help the food preparer conveniently remove slices of food product. Food interleavers can be used with food product other than slices and can be used to separate cuts of meat, patties (e.g., hamburgers, vegetable burgers, etc.), fish, spreads (e.g., butter or margarine), etc.

Food interleavers are generally intended to be used in a moist environment. As a result, it is desirable for food interleavers to possess a sufficient level of release and barrier properties, and a sufficient level of strength. Release properties are desirable so that the food interleaver can be separated from the food product. Barrier properties are desirable to reduce water hold out. That is, it can be desirable to minimize the water pick up by the food interleaver from the food product. Water pick up from a food product can cause a change in texture of the food product, and cause a loss in weight of the food product. In addition, water pick up from a food product may cause the food product to freeze together when it is frozen. Barrier properties can also be desirable to reduce fluids from transferring through the food interleaver. A sufficient level of strength is desirable so that the food interleaver can be entirely removed from the food product without leaving parts, such as fibers, with the food product.

The food interleaver can be provided containing a food flavorant component. A food flavorant component is a substance that can be provided in a food product to impart a desired flavor to the food product. In addition, the food flavorant component is preferably a component that is considered to be safe when incorporated into a food product. The food flavorant component can be provided as a part of the food interleaver and, as a result of the contact between the food product and the food interleaver, the food flavorant component can transfer from the food interleaver to the food product to impart a desired flavor to the food product. The transfer can be a result of mass transfer or diffusion from the food interleaver to the food product over time. An advantage of providing a food interleaver with a food flavorant component is that a standard or base food product can be prepared that can then be flavored as a result of contacting the food product with the food interleaver. The food product can be flavored differently depending upon the food interleaver selected for contacting the food product. For example, a cheese product can be prepared and can be sliced and contacted with a food interleaver containing a "smoky" flavor food flavorant component to impart a smoky flavor to the cheese. In addition, part of the cheese product can be contacted with a food interleaver containing a different food flavorant component to impart a different flavor to the cheese. By incorporating a food flavorant component into the food interleaver, one can avoid having to prepare separate batches of food product containing different food flavorant component.

The food flavorant component that can be used include those food flavorants that can be incorporated into a food interleaver and that will transfer from the food interleaver to the food product as a result of contact between the food product and the food interleaver. Exemplary food flavorants that can be used include those that impart one or more of the following flavors: smoky, mint, bacon, spicy, onion, garlic, horseradish, barbeque, mustard, jalapeno, pepper, nutty, ginger, chicken, beef, pork, turkey, or mixtures thereof. Exemplary smoky flavor food flavorants include those available under the names Charsol Applewood Poly 2503, Charsol/Smokez Applewood 2502, Charsol/Smokez Applewood Poly 2503, Charsol/Smokez Applewood 2502, Charsol/Smokez P-10 Poly, Charsol/Smokez HP-10 Poly Hickory, and Charsol P-10 Poly from Red Arrow Products Company LLC of Manitowoc, Wis. Exemplary meat food flavorants include those available from Flavor and Fragrance Specialties of Mahwah, N.J. It should be understood that food flavorants are not chemicals that happen to be present in the food interleaver that impart an "off flavor" to a food product. That is, food flavorants include those components that are added specifically to provide a desired flavor to a food product. Prior food interleavers have been prepared to minimize altering the flavor of foods they contact.

The food flavorant component can additionally provide for transfer of an odor or smell from the food interleaver to the food product. Odor can be considered a form of flavorant when people associate an odor with a flavor. In addition, separate odorant components can be added to the food interleaver to impart an odor or smell to food product that contacts the food interleaver. The food flavorant may provide both flavor and odor.

The food flavorant component can be added as a separate component to the food interleaver or it can be added in combination with other components during the formation of the food interleaver. It has been found that it is convenient to add the food flavorant component as a part of a treatment composition added to a paper base sheet during the formation of the food interleaver. The treatment composition refers to a water-based composition that is applied to a paper base sheet to impart desired properties of release, barrier, and strength. The treatment composition can be added to the paper base sheet during the papermaking process (referred to as "on machine") or it can be added in a subsequent of treating the paper sheet after it has been formed and wound into a roll. The treatment composition can be referred to as a water-based treatment composition, and can be referred to as the "composition." The treatment composition can be provided in various forms including as an emulsion, a dispersion, or a solution.

The treatment composition can be characterized as having an amount of water that allows the treatment to flow and penetrate into the paper base sheet. The treatment composition can provide a layer within the paper base sheet and it can provide a layer on the paper base sheet. The treatment composition can include a release and barrier component suspended in the water that remains after the water has been evaporated to provide release and barrier properties. The treatment composition can have a solids content of at least about 1 wt. % or at least about 2 wt. %, and can have a solids content of less than about 50 wt. % when it is applied to the paper base sheet. The solids content refers to the components of the treatment composition that remain after evaporation of water. The treatment composition can have a solids content of about 10 wt. % to about 35 wt. %, about 12 wt. % to about 30 wt. %, and about 15 wt. % to about 25 wt. %.

Components of the treatment composition can include the release and barrier component, food flavorant, polymeric film former, sizing agent, release agent, defoamer, viscosity control agent, and filler.

The release and barrier component of the composition can provide a desired level of release and barrier properties for the food interleaver. The release and barrier component of the composition can be any material that forms desired release and barrier properties when the water is evaporated and that provides a resulting coating that can be characterized as FDA compliant for food contact with aqueous and fatty foods. Exemplary release and barrier components include paraffin wax, polyethylene wax, isoparaffinic wax, microcrystalline wax, natural wax such as carnuba and bees wax, stearylated melamine, alkyl ketene materials wherein the alkyl group contains at least about 8 carbon atoms, octyl succinic anhydride, Werner chrome complex, silicones, and fluorochemicals. Exemplary compositions containing stearylated melamine are available under the names Bersize S-175, Bersize 6103, and Berbond 8040 from Bercen; Norpel 7650, Norpel IT, Norpel 7645, Norpel 7640M, Norpel 7685, Norpel 1050, and Norpel 1100 from Northern Products; and Sequapel 414, Sequapel 409, 3058-3B, and Sequapel 407 from RohmNova. Exemplary compositions that contain different active ingredients are available under the names Sansize FE-125, a cyclic amine polymer from PPG; EV-XWP, a polyethylene terephthalate (PET) from Evcote; Microspersion 230, a polyethylene emulsion from Micro Powders, Inc., and EXP571TF, a non fluorochemical grease resistant from Michelman. Exemplary fluorochemicals are available under the names Cartfluor UH from Clariant; Zonyl NF, Zonyl RP, and Zonyl 9464 from DuPont; Lodyne P-208E and Lodyne 2000 from Ciba; Norpel 7615 and Norpel 7630 from Northern Products; and Solvera PT 5045 from Solvay-Solexis. It is believed that certain release and barrier components can be formed in situ. An exemplary release and barrier component that can be formed in situ is stearylated melamine by a reaction of stearic acid and melamine. It is believed that heat supplied during the paper drying step will cause the stearic acid and melamine to react to form stearylated melamine.

The release and barrier component can be provided in the treatment composition in an amount sufficient to provide the desired release and barrier properties for the food interleaver. The amount of the release and barrier component in the treatment composition can depend on the selected release and barrier component. In general, the release and barrier component can be included in the treatment composition in an amount of at least about 0.05 wt. %. The amount of the release and barrier component can be included in the treatment composition in amounts up to about 20 wt. % in order to leave room for additional components for the treatment composition. An exemplary range for the release and barrier component of the treatment composition is about 0.1 wt. % to about 10 wt. %. It should be understood that these weight percentages are based upon 100% activity. In addition, certain release and barrier components can be provided at lower concentrations to achieve desired release and barrier properties. For example, stearylated melamine can be provided at a concentration of about 0.5 wt. % to about 2 wt. %. Fluorochemicals can be provided at a concentration of about 0.05 wt. % to about 0.5 wt. %. Other release and barrier components such as waxy release and barrier components can be provided at concentrations of at least about 1 wt. % to achieve desired release and barrier properties. The other release and barrier components such as waxy release and barrier components can be provided at concentrations of about 1 wt. % to about 20 wt. %, and can be provided at concentrations of about 2 wt. % to about 10 wt. %. The amount of the release and barrier component can be identified based on the dry weight of the food interleaver. For example, the release and barrier component can be provided in the food interleaver in an amount of about 0.05 wt. % to about 10 wt. % based on the dry weight of the food interleaver. The release and barrier component provided as a fluorochemical can be provided in the food interleaver in an amount of about 0.1 wt. % to about 0.5 wt. % based on the dry weight of the food interleaver. Release and barrier components provided as wax can be provided in the food interleaver in an amount of about 1 wt. % to about 10 wt. % based on the dry weight of the food interleaver.

A food flavorant component can be provided as part of the treatment composition so that, when the treatment composition is applied to the paper base sheet, the food flavorant component becomes a part of the food interleaver. Alternatively, the food flavorant component can be added before or after the treatment composition containing the release and barrier component is applied to the paper base sheet. It is desirable that the food flavorant component, when provided as part of the food interleaver, is available for transfer to the food product that contacts the food interleaver.

The food flavorant component can be provided in the food interleaver in an amount sufficient to allow a flavor imparting amount of the food flavorant component to transfer from the food interleaver to a food product as a result of contact between the food product and the food interleaver. It is generally expected that the food product will be packaged while in contact with the food interleaver, and then shipped to a desired location. It is desirable for a sufficient amount of transfer to occur by the time a consumer purchases the article for consumption so that the consumer would experience the flavor transferred to the food product as a result of the presence of the food flavorant component and the food interleaver. Accordingly, the contact time between the food product and the food interleaver can be at least about 7 days. Over a contact period of at least about 7 days, the food flavorant component can transfer sufficiently to impart a desired flavor to the food product. The contact period can be at least about 14 days, and can be at least about 30 days. The transfer of the food flavorant from the food interleaver to the food product can take place without heating or cooking. For example, the transfer can take place while the food product is cooled or refrigerated.

The amount of the food flavorant provided in the interleaver depends on the desired flavorfulness of the food product, the length of contact time between the food product and the food interleaver, the transferability or migration ability of the food flavorant to move from the food interleaver to the food product, and the amount of the food flavorant provided in the food interleaver. Additional factors that can effect the transfer include the temperature at which the food product and food interleaver are held, the various components of the treatment composition and/or the food interleaver that may hinder migration or transfer of the food flavorant component to the food product, and the moisture content of the food product. One way to characterize the amount of the food flavorant component in the food interleaver is to characterize the amount of the food flavorant component provided in the treatment composition. By way of example, the food flavorant can be provided in the treatment composition in an amount of at least about 1 wt. %, at least about 2 wt. %, or at least about 5 wt. %. In addition, the amount of the food flavorant provided in the treatment composition can be less than about 60 wt. % to provide room for other components. The amount of the food flavorant in the treatment composition can be provided at about 10 wt. % to about 50 wt. %, and about 15 wt. % to about 30 wt. %. It is recognized that the food flavorant need not be incorporated into the treatment composition in order to become a part of the food interleaver. The food flavorant component can be characterized as a part of the food interleaver on a dry basis of the food interleaver. Accordingly, the amount of the food flavorant component in the food interleaver can be, for example, about 1 wt. % to about 30 wt. % of the food interleaver on a dry weight basis, about 2 wt. % to about 25 wt. %, about 5 wt. % to about 20 wt. %, and can be about 10 wt. % to about 18 wt. %.

Polymeric film formers can be provided in the treatment composition to help keep components of the treatment composition on or near the surface of the paper base sheet. Certain polymeric film formers may polymerize after application to the paper base sheet. Exemplary polymeric film formers that can be incorporated into the treatment composition include oxidized starches, ethylated starches, cationic starches, unmodified starches, proteins, starch latex graft copolymers, polyvinyl acrylates, polystyrene acrylate, styrene butadiene, polyvinyl alcohol, vinyl acetate acrylic, styrene acrylates, vinyl acetate, styrene maleic anhydride, or mixtures thereof.

The polymeric film former (e.g. the starch component) is an optional component of the treatment composition and can be included to aid in run ability of the paper product. The polymeric film former, when included in the treatment composition can be included in an amount of at least about 1 wt. % and up to about 20 wt. % based on the weight of the treatment composition. In addition, the treatment composition can include the polymeric film former in amounts of about 2 wt. % to about 16 wt. % and about 4 wt. % to about 12 wt. %.

Viscosity control agents can be included in the treatment composition to adjust the viscosity of the treatment composition. It should be understood that viscosity control agents are optional components and need not be included in the treatment composition. Exemplary viscosity control agents that can be incorporated into the treatment composition include sodium acrylate, guar gum, gum arabic, xanthan gum, or mixtures thereof.

Fillers can be included in the treatment composition. It should be understood that fillers are not a required component of the treatment composition. Exemplary fillers that can be incorporated into the treatment composition include clay, polystyrene micro spheres, calcium carbonate, talc, titanium dioxide, silica, or mixtures thereof.

The treatment composition can be applied to the paper base sheet during the paper manufacturing process. This technique can be referred to as "on machine." Various compositions are often applied to paper after the paper has been formed and provided in a roll and sometimes by "converters." This type of treatment can be referred to as "off machine." An advantage of on machine application of the treatment composition is the ability to better control the wet end chemistry in a manner to assist with the application of the treatment composition. In addition, it is possible to avoid dry waxing that is often carried out by converters. It is expected that dry waxing could have a tendency to "seal in" the food flavorant component. Accordingly, dry waxing can be avoided, if desired.

The food interleaver can have a solids content resulting from the application of the treatment composition that is sufficient to provide the desired release and barrier properties. The solids content of the food interleaver resulting from the treatment composition can be at least about 5 wt. %. In addition, the solids content of the food interleaver resulting from the treatment composition can be less than about 30 wt. %. The solids content of the food interleaver as a result of the treatment composition can be about 10 wt. % to about 25 wt.

%. It should be understood that the solids content of the food interleaver refers to dry weight.

Now referring to FIG. 1, an exemplary schematic diagram showing a process for the manufacture of a food interleaver according to the invention is shown at reference numeral 10. It should be understood that the exemplary diagram in FIG. 1 includes many of the general operations carried out in commercial papermaking facilities. The equipment used in a particular operation may vary from facility to facility, but it is expected that the general operations will be present.

Starting material 12 generally includes wood pulp 14. As shown in FIG. 1, the wood pulp 14 can be provided in the form of baled wood pulp or can be slush pulp from a pulp mill. The wood pulp 14 can be introduced into a hydrapulper 18 to provide a slurry 20. The slurry 20 is then conveyed via pump 22 and slurry line 24 to a refining operation 25. A refiner 26 operates on the slurry 20 to increase the bonding of the fiber and shorten and control the fiber length to provide a refined fiber product 28. The refining operation 25 can also be carried out to hydrate the cellulosic fiber to provide a base sheet having desired barrier properties. The refiner 26 can be, for example, a double disc refiner, a conical refiner, or a Hollander beater. The refiner shown is a double disc refiner 30.

The refined fiber product 28 is conveyed through the refined fiber conveyor line 32 to a cleaning operation 40. The cleaning operation 40 can include a series of hydrocyclones 44 for removing high density and low density particulates. A screening system may be present after the cleaning operation 40 to remove foreign matter.

The cleansed fiber 46 resulting from the cleaning operation 40 is conveyed through the cleansed fiber delivery line 48 to a paper forming operation 50. The paper forming operation 50 shown in FIG. 1 can be referred to as a fourdrinier process 52. The fourdrinier process 52 includes a rotating screen 54 upon which the cleansed fiber 46 is applied to form a paper base sheet 60. In general, the cleansed fiber 46 can be applied through the head box 62 to allow the cleansed fiber 46 to be laid down on the rotating screen 54. It should be understood that the rotating screen 54 is often referred to as the wire. The cleansed fiber 46 is applied to the rotating screen 54 over the breast roll 64, and the paper base sheet 60 is removed from the rotating screen 54 over the couch roll 66. A dandy roll 68 can be used to help orientate and distribute the cleansed fiber 46 across the rotating screen 54 to provide a desired fiber distribution. A suction box 70 can be provided to help remove water from the paper product 60.

Chemicals are often added during a paper making process from the hydrapulper to the headbox. The addition of chemicals during these operations is often referred to as "wet end chemistry." In general, it is expected that wet end chemistry will provide a fairly even distribution of the applied chemicals through the thickness of the resulting paper product.

An exemplary component that can be added as wet end chemistry includes a wet strength agent. Exemplary wet strength agents that can be added include urea formaldehyde, melamine formaldehyde, and amine polymer-epichlorohydran adduct such as that available under the name Kymene 970 from Hercules Inc. The wet strength agent can be added to provide a paper product having a desired level of wet strength or wet tensile strength. In the case of the food interleaver, it is generally expected that the amount of wet strength agent added can be sufficient to provide at least about 0.1 wt. % wet strength agent based on the final dry weight of the food interleaver. It is generally expected that a sufficient amount of wet strength or wet tensile strength can be provided when the amount of the wet strength agent is less than about 5 wt. % based on the final dry weight of the food interleaver. An exemplary range of wet strength agent can be about 0.5 wt. % to about 3 wt. %.

The cleansed fiber 46 can have a solids content of about 0.5% before it is applied to the rotating screen 54. It should be understood that the solids content refers to the fiber content of the aqueous slurry. After the paper 60 passes over the couch roll 66, the paper can have a solids content of between about 15% and about 20%.

The paper base sheet 60 then moves through a press operation 72 for the removal of water. In general, pairs of rollers 74 and 76 are provided for pressing the paper base sheet 60 for squeezing out water. Felts 78 can be used to help pull water out of the paper base sheet 60.

The paper base sheet 60 is then processed through a dryer section 80. In general, the paper base sheet 60 flows over cylinders 82 that heat the paper base sheet 60 and drive off water. The cylinders 82 can be filled with high pressure steam. The thermal energy from the cylinders 82 causes the water in the paper base sheet 69 to vaporize. Dryer felts 84 and 86 can be used to help hold the paper base sheet 60 against the cylinders 82.

An applicator 90 can be provided for the delivery of a water based composition to the paper base sheet 60. Before the paper base sheet 60 is dried to a final water content, the paper base sheet 60 can be referred to as green sheet 94. In general, the green sheet 94 can have a water content of between about 0 and about 15 wt. %. The composition can be applied to the surface of the green sheet 94 by the applicator 90. Once the composition is applied to the green sheet 94, the paper product 98 can be further dried to remove water in an additional drying operation 110. The additional drying operation 110 can include non-contact dryers and/or cylinder 112 for driving off water, and felts 114 and 116 for holding the paper product 98 against the cylinders 112.

The paper product 98 can then be calendered on or off machine by using steel, soft nip, or supercalenders and taken up in a roll. In a subsequent operation 120, the roll can be unwound and cut to a desired width and then wound into a roll for distribution to a customer.

The composition can be applied to the paper base sheet 60 at the emulsion applicator 90. The application of the composition in combination with the wet end chemistry controls how much of the composition penetrates into the paper base sheet, and how much remains on the surface. This balance of penetration and soak in can be provided differently for various applications. That is, the penetration and soak in of the water based composition into the paper base sheet 60 can be adjusted depending upon the desired final product.

The applicator 90 can be any structure that adequately applies the composition to the paper base sheet 60. The applicator 90 shown in FIG. 1 is a size press 96. Exemplary alternative applicators include a metering size press, a spray applicator, a blade coater, bil blade coater, rod coater, curtain coater, and gate roll coaters. A convention size press 96 can generally be characterized as having a pair of nipped rolls 122 and 124 and a nip shower bar 126 that allow for the formation of a puddle of the composition on both sides of the paper base sheet passing through the nipped rolls. The metering size press includes a roll that applies the composition to each side of the paper base sheet as the paper base sheet contacts the applicator rolls. A pump or meter can be used to control the amount of composition applied to the roll and subsequently applied to the paper base sheet. Another roll can be provided downstream of the first roll to apply the composition to the opposite side of the paper base sheet. A spray applicator can be used to spray the composition onto the paper base sheet.

Control of the base sheet properties such as porosity and sizing, in combination with control of the composition solids and rheology results in control of the treatment level in a conventional size press application.

The step of applying the composition to the paper base sheet 60 can be characterized as occurring on a paper manufacturing machine. That is, the steps of forming the paper and applying the emulsion can occur on a single processing line without having to ship the paper base sheet to another location for application of the emulsion. In the case of dry waxing, the paper base sheet is typically shipped to a converter who applies the wax to the paper base sheet. In contrast, the composition can be applied on line with the manufacture of the paper base sheet.

The food interleaver according to the invention can be provided with release properties. It is desirable for the food interleaver to have sufficient release properties to allow the food interleaver to peel away from the food, leaving the food intact without fibers being transferred to the food. In certain applications, the food interleaver can become saturated with fluid resulting from contact with the food and it is desirable that the food interleaver will peel away from the food without disintegrating.

The food interleaver can be used with at least one of cheese, meat, meat patties, frozen meat, ground meat, and spreads to provide separation and dispensing. For example, the food interleaver can be used with sliced cheese and/or sliced meat and should provide sufficient release properties to function as a slice interleaving paper that provides separation of slices and dispensing of slices. Slices of meat include luncheon meat. Exemplary types of luncheon meat include turkey, chicken, ham, roast beef, corned beef, etc., and those processed meat product such as bologna, summer sausage, salami, etc. Exemplary types of non-sliced meat include hotdogs, sausages, etc. Fibers in the paper should not become imbedded in the food product so that they become a part of the food product. The food interleaver should provide desired performance under varying conditions of temperature, moisture, pH, and long storage periods often encountered in cheese and/or meat processing. It is desirable for the treated paper to maintain physical strength after absorbing the fluids as a result of contact with cheese and meat. The food interleaver should be able to run acceptably in the various cheese and/or meat processing equipment. This includes the ability to cut the sheet cleanly and properly feed high speed converting equipment (e.g., Schindler cheese processing equipment).

The food interleaver can be prepared to provide a paper product having a basis weight of about 10 lb/3,000 ft$^2$ to about 55 lb/3,000 ft$^2$. The food interleaver can have a basis weight of about 15 lb/3,000 ft$^2$ to about 50 lb/3,000 ft$^2$, and a basis weight of about 20 lb/3,000 ft$^2$ to about 40 lb/3,000 ft$^2$.

The food interleaver can have properties sufficient to provide a desired level of release and barrier properties. In general, the food interleaver should not be so sticky that it is difficult to remove from the food product. For example, the food interleaver can provide a tape adhesion value of less than about 18 ounces/inch according to TAPPI T-816. It can be desirable for the food interleaver to be fairly slippery. Accordingly, the tape adhesion value can be as low as about 1 ounce/inch according to TAPPI T-816.

The food interleaver can have a strength that is desirable so that it does not disintegrate or leave fibers attached to food product. For example, the food interleaver can be provided having a wet tensile strength (CD) according to TAPPI T-456 of at least about 2 lb/in.; a wet tensile strength (MD) according to TAPPI T-456 of at least about 6 lb/in.; a Tear CD-Elmendorf according to TAPPI T-414 of at least about 40 g$_f$; and a Tear MD-Elmendorf according to TAPPI T-414 of at least about 30 g$_f$. The food interleaver can have wet tensile strength and tear values that are as high as possible. It is expected that the food interleaver will function at wet tensile strength (CD) according to TAPPI T-456 of less than about 5 lb/in.; wet tensile strength (MD) according to TAPPI T-456 of less than about 9 lb/in.; Tear CD-Elmendorf according to TAPPI T-414 of less than about 55 g$_f$; and Tear MD-Elmendorf according to TAPPI T-414 of less than about 45 g$_f$.

Figure 2:
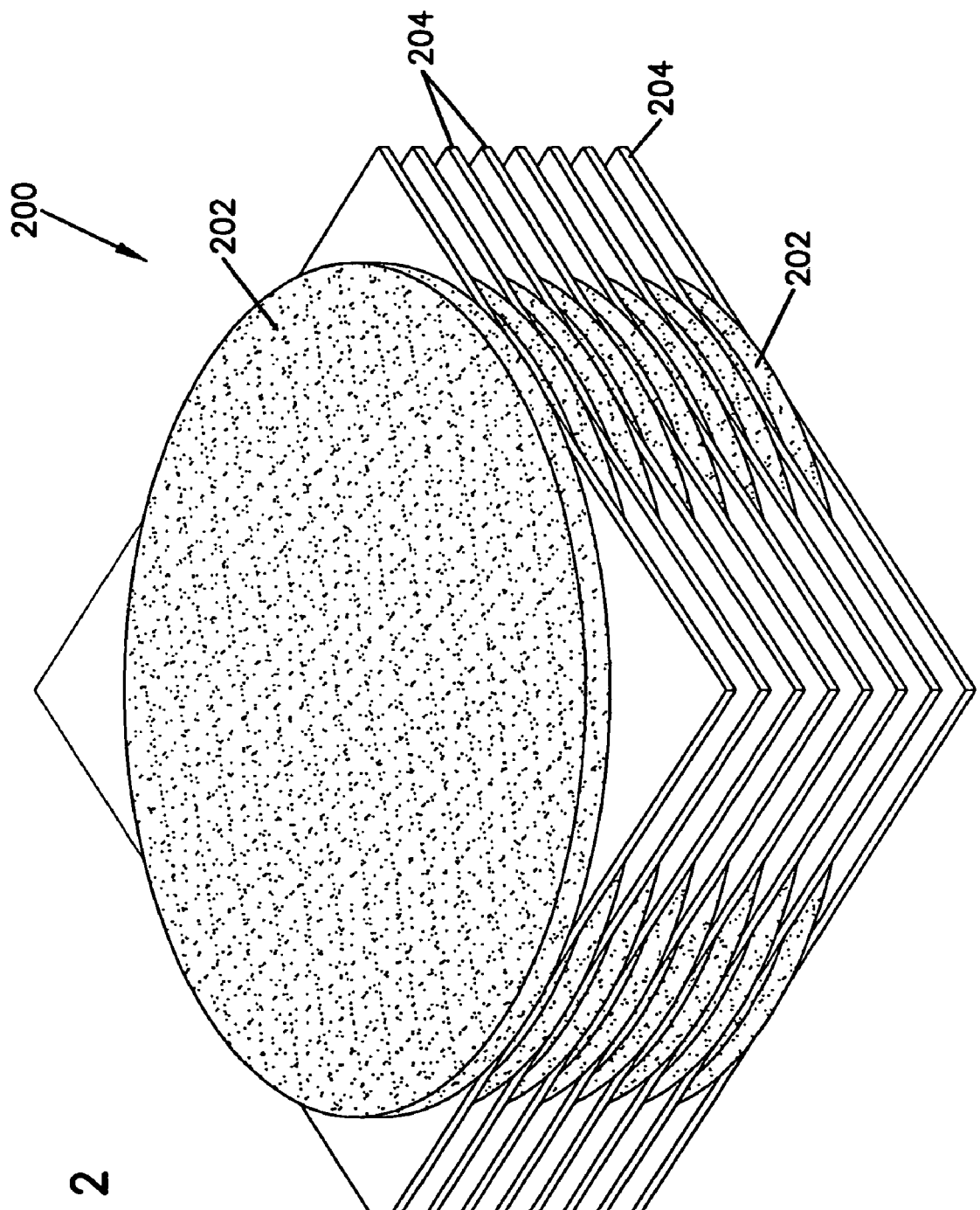
FIG. 2 is a perspective view of a combination food product and food interleaver according to the principles of the present invention.

Now referring to FIG. 2, a combination food product and food interleaver is shown at reference number 200. The combination food product and food interleaver 200 includes layers or slices of food product 202 separated by food interleavers 204.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for imparting flavor to food product, the method comprising:
   (a) contacting a food interleaver containing a food flavorant component with a food product for a length of time sufficient to allow at least a portion of the food flavorant component to transfer from the food interleaver to the food product, wherein the food interleaver and the food product are provided in a stack of alternating food product and food interleaver so that opposite sides of the food interleaver contact the food product, and wherein the food interleaver comprises a treated paper base sheet.

2. A method according to claim 1, wherein the food product comprises at least one of slices of cheese or slices of meat.

3. A method according to claim 1, wherein the contacting comprising contacting for at least about 7 days.

4. A method according to claim 1, wherein the food interleaver has a basis weight of about 10 lbs/3,000 ft$^2$ to about 30 lbs/3,000 ft$^2$.

5. A method according to claim 1, wherein the food interleaver comprises about 5 wt. % to about 60 wt. % of the food flavorant component based on the dry weight of the food interleaver.

6. A method according to claim 1, wherein the food interleaver includes a wet tensile strength (CD) according to TAPPI T-456 of at least about 2 lb/in.; a wet tensile strength (MD) according to TAPPI T-456 of at least about 6 lb/in.; a Tear CD-Elmendorf according to TAPPI T-414 of at least about 40 g$_f$; a Tear MD-Elmendorf according to TAPPI T-414 of at least about 30 g$_f$.

7. A method according to claim 1, wherein the food interleaver exhibits a tape adhesion of less than about 18 ounces/inch according to TAPPI T-816.

8. A method according to claim 1, wherein the food interleaver has a first side and a second side, and comprises the food flavorant component applied both the first side and the second side of the food interleaver.

9. A method according to claim 1, wherein the food product comprises meat patties.

10. A method according to claim 1, wherein the food product comprise slices of meat comprising slices of turkey, slices of chicken, slices of ham, slices of roast beef, slices of corn beef, slices of bologna, slices of summer sausages, slices of salami, or a mixture thereof.

11. A method according to claim 1, wherein the food product comprises at least one of hot dogs and sausages.

12. A method according to claim 1, wherein the food product comprises spreads.

13. A method according to claim 1, wherein the food interleaver comprises a release and barrier component and the food flavorant.

14. A method according to claim 1, wherein the food interleaver comprises about 0.05 wt. % to about 10 wt. % of a release and barrier component based on the dry weight of the food interleaver.

15. A method according to claim 14, wherein the release and barrier component comprises at least one of stearylated melamine, polyethylene wax, paraffin wax, isoparaffin wax, microcrystalline wax, fluoropolymer wax, silicone wax, alkyl ketene materials, octyl succinic anhydride, Werner chrome complex, natural wax, fluorochemical, or mixtures thereof.

16. A method according to claim 1, wherein the food interleaver comprises a wet strength agent.

17. A method according to claim 16, wherein the wet strength agent is provided in an amount of about 0.1 wt. % based on the final dry weight of the food interleaver.

18. A method according to claim 16, wherein the wet strength agent is provided in an amount of about 0.5 wt. % to about 3 wt. % based on the final dry weight of the food interleaver.

19. A method according to claim 16, wherein the wet strength agent comprises at least one of urea formaldehyde, melamine formaldehyde, or amine polymer-epichlorohydran adduct.

* * * * *